Patented Feb. 7, 1950

2,496,444

UNITED STATES PATENT OFFICE 2,496,444

DIESEL FUEL

Fay Vincent Cook, Tulsa, Okla., assignor to Stanolind Pipe Line Company, Tulsa, Okla., a corporation of Maine No Drawing. Application October 30, 1945, Serial No. 625,680

3 Claims. (Cl. 44—77)

This invention relates to fuels for internal combustion engines of the Diesel type and is more particularly concerned with the modification of such fuels by the addition of a corrosion inhibiting agent.

In the Diesel type of engine, a liquid fuel is positively injected into the combustion space, the fuel being forced with or without combustion supporting gases, e. g., air, into the combustion space by means of an injecting pump. Such pumps or adjustable injection devices associated with injection engines normally are so constructed that there is no provision for compensating for maladjustment due to corrosion. With the corrosion of these elements, they begin to leak and so incorrectly to deliver the fuel to the engine, thus progressively decreasing the efficiency of the engine and its ability to deliver proper power at all times. Hence, the wear and corrosion of the injector elements is a serious factor in the overall expense and continued efficiency of the Diesel engine. It is, therefore, a primary object of the present invention to provide a system for protecting such pumps and injectors from corrosion.

In the transportation of crude by pipe line it has been found expedient to divert a minor portion of the crude and employ it as fuel for Diesel engines operating the pipe line pumps. However, when corrosive crude is handled there is frequent failure of the fuel injection system. Hence it is another object of this invention to provide a method of inhibiting the tendency of crude to corrode Diesel engines in such service. Another object of the present invention is to provide a method for inhibiting the corrosive action of Diesel fuels containing sulfur compounds. These and other objects will become apparent as the description of the invention proceeds.

By using the method of the present invention, a hydrocarbon fuel otherwise adapted for Diesel engine use but containing a detrimental amount of a corrosive material may be treated to inhibit the normal tendency to attack the fuel supply assemblies without adversely affecting the ignition qualities of the fuel.

I have discovered that the general class of compounds known as aldehydes possesses the peculiar property, when added in small amounts to a sour Diesel fuel, of inhibiting the normal tendency of such fuel to corrode the fuel injection elements. The proportion of aldehyde added will depend upon the normal corrosive tendency of the hydrocarbon. Hydrogen sulfide in the crude is corrosive to iron and steel in the presence of water and if dissolved air is present in addition to hydrogen sulfide and water, corrosion normally proceeds at a very rapid rate.

The aldehyde can be used in the proportion of between about 0.002 and about 2.0 percent, for example between about 0.001 and about 0.05 volume percent. More particularly, I have found that formaldehyde, when employed in the ratio of about one gallon to every seventy-five barrels (42 gal.) of sour Diesel fuel (i. e. about 0.01 percent), will effectively inhibit its normal tendency to corrode and render the fuel satisfactory for use in Diesel engines. By the term "formaldehyde" as used in this specification, I intend to include the 40% aqueous solution of formaldehyde known commercially as "formalin."

The fuel composition of the present invention can be prepared by dissolving the predetermined proportion of the aldehyde in the fuel to be supplied to the injection engine pump or injector. This may be effected by admixing the agent with a large body of the fuel prior to use or may be continuously added to a relatively small stream of the fuel enroute to the injector.

It is not entirely clear by what mechanism the formaldehyde treatment effects the inhibition of corrosion due to the sour fuel. One possible explanation is that the aldehyde reacts with only a portion of the hydrogen sulfide to produce a thin protective film of a reactive product, which may be a thio-aldehyde, on the exposed metal surfaces. A protective film is thereby maintained on the exposed surface of the equipment and this film might act to prevent further corrosion. Another possible explanation is that the aldehyde reacts with a small proportion of hydrogen sulfide to yield a compound which immediately reacts with the iron surface to form the protective film. Chemical reactions are known in which formaldehyde and hydrogen sulfide react to form mercaptan-like compounds. The mere addition of mercaptans, however, is ineffective as an inhibitor and therefore it appears that the reaction yields some other compound possibly in only minor proportions which acts to inhibit corrosion. It is not intended, however, that this invention is limited to these theories of mechanisms of protection.

In one installation where a portion of sour crude being transported in a pipe line was diverted for use in a Diesel engine which operated the pipe line pumps, it had been necessary to replace the Diesel injector elements every two or three weeks because of excessive corrosion. Following the treatment in accordance with this invention, there has been no failure of spray valves or needles due to corrosion.

By the term "Diesel fuel" or "Diesel type fuels" as it is used herein, I have reference not only to the distillates of the kerosene type normally denoted as Diesel fuels, but I intend to include as well the general class of hydrocarbon products both heavier and lighter than the fuel above referred to, such, for example, as the light or heavy fuel oils and gasoline for use in internal combustion engines, such as the Diesel cycle engine.

The foregoing description has been with particular reference to the use of formaldehyde as an example of the class of materials contemplated by this invention. It is to be understood, however, that aldehydes as a class including aromatic and aliphatic aldehydes are contemplated. Mixtures of aldehydes can be used and the treating agent can be derived, for example, by oxidation of hydrocarbons or by synthesis from hydrogen and carbon monoxide. The aliphatic aldehydes possess unusual characteristics and are selected since they constitute a class of compounds having a range of boiling points that make it possible to select the chemical agent having the desired properties under the particular conditions of the treatment. For most engine conditions one of the lower aldehydes of the aliphatic series, for example, one having four or fewer carbon atoms to the molecule, will be found suitable. Formaldehyde is preferred, however, and the various aldehydes including acetaldehyde, propaldehyde, and butyraldehyde, are not alternative. Specifically, tests show that under conditions in which formaldehyde is an effective inhibitor, acetaldehyde in an equimolecular concentration is 80 percent as effective in combatting the attack of hydrogen sulfide.

It will be understood that the foregoing disclosure is for the purpose of illustration only and that various modifications can be made by those skilled in the art without departing from the scope of the invention defined by the appended claims.

I claim:

1. A non-corrosive Diesel fuel consisting essentially of a sour crude oil fraction boiling in the Diesel fuel range and a corrosion inhibitor consisting of between about 0.01 and 0.05 volume percent of formaldehyde.

2. An injection engine fuel consisting essentially of a sour kerosene distillate containing connate sulfur compounds which are normally corrosive to ferrous metal at high temperature and an added corrosion inhibitor consisting of between about 0.002 and 2.0 volume percent of formaldehyde whereby the normally corrosive sour distillate is rendered non-corrosive at high temperature.

3. A non-corrosive injection engine fuel consisting essentially of a sour hydrocarbon oil boiling in the Diesel fuel boiling range and containing sulfur compounds which are normally corrosive to ferrous metal in fuel injection systems and an added amount of formaldehyde in the range of between about 0.002 and 2.0 volume percent and sufficient to render said oil non-corrosive to such ferrous metal surfaces.

FAY VINCENT COOK.

REFERENCES CITED

The following references are of record in the file of this patent:

UNITED STATES PATENTS

| Number | Name | Date |
|---|---|---|
| 2,319,630 | Prutton | May 18, 1943 |
| 2,385,158 | Paulsen | Sept. 18, 1945 |
| 2,433,716 | Smith | Dec. 30, 1947 |

FOREIGN PATENTS

| Number | Country | Date |
|---|---|---|
| 439,608 | Germany | Jan. 15, 1927 |